United States Patent
Na et al.

(10) Patent No.: US 8,318,371 B2
(45) Date of Patent: Nov. 27, 2012

(54) SEPARATOR FOR FUEL CELL AND FUEL CELL STACK USING THE SAME

(75) Inventors: Young-Seung Na, Suwon-si (KR); Jun-Ho Sauk, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 588 days.

(21) Appl. No.: 12/465,878

(22) Filed: May 14, 2009

(65) Prior Publication Data

US 2009/0291349 A1 Nov. 26, 2009

(30) Foreign Application Priority Data

May 26, 2008 (KR) .................. 10-2008-0048560

(51) Int. Cl.
*H01M 8/10* (2006.01)

(52) U.S. Cl. ........................ 429/457; 429/514

(58) Field of Classification Search ............ 429/457, 429/458, 514, 518
See application file for complete search history.

(56) References Cited

U.S. PATENT DOCUMENTS

| | | | |
|---|---|---|---|
| 6,348,280 B1 | 2/2002 | Maeda et al. | |
| 6,500,579 B1 | 12/2002 | Maeda et al. | |
| 6,786,937 B2 * | 9/2004 | Kralick | ............... 29/623.2 |
| 2002/0142205 A1 | 10/2002 | Kim et al. | |
| 2005/0074652 A1 | 4/2005 | Choi | |
| 2005/0136318 A1 | 6/2005 | Garceau | |
| 2006/0035133 A1 | 2/2006 | Rock et al. | |
| 2006/0115705 A1 | 6/2006 | Choi et al. | |
| 2007/0298311 A1 | 12/2007 | Zeng et al. | |

FOREIGN PATENT DOCUMENTS

| | | |
|---|---|---|
| CN | 101036249 A | 9/2007 |
| FR | 2 862 434 A | 5/2005 |
| FR | 2862434 A1 | 5/2005 |
| JP | 2001-057219 | 2/2001 |
| JP | 2001-068131 | 3/2001 |

(Continued)

OTHER PUBLICATIONS

Office Action dated Apr. 6, 2011 in related Chinese Patent Application No. 200910202832.0.

(Continued)

*Primary Examiner* — Thanhha Pham
(74) *Attorney, Agent, or Firm* — Knobbe, Martens, Olson & Bear LLP

(57) ABSTRACT

A fuel cell separator capable of improving stack performance by reducing the deviation in cell performance and diminishing dead space, and a fuel cell stack using the same are disclosed. The fuel cell separator may include a base member, a first channel group disposed on a surface of the base member and a second channel group disposed on the surface of the base member. The first channel group may include at least one channel and the second channel group may include at least one channel. The first channel group and the second channel group may extend parallel to each other in a first region of the surface and independent from each other in a second region of the surface.

13 Claims, 4 Drawing Sheets

FOREIGN PATENT DOCUMENTS

| | | |
|---|---|---|
| JP | 2002-313360 A | 10/2002 |
| JP | 2005-108850 A | 4/2005 |
| JP | 2005-142155 A | 6/2005 |
| JP | 2005-174762 A | 6/2005 |
| JP | 2005-251699 A | 9/2005 |
| JP | 2006-086137 A | 3/2006 |
| JP | 2006-156398 A | 6/2006 |
| KR | 1020040046825 A | 5/2004 |
| KR | 1020060059614 A | 2/2006 |
| KR | 10 2006 0108342 A | 10/2006 |
| KR | 1020070025569 A | 8/2007 |
| KR | 10 0830980 B1 | 5/2008 |

OTHER PUBLICATIONS

Korean Office Action for related Korean Patent Application No. 10-2008-0048560; dated May 31, 2010.

Korean Office Action for related Korean Patent Application No. 10-2008-0048560; dated Aug. 31, 2010.

Extended European Search Report for European Patent Application No. 09290385.5; dated Aug. 6, 2009.

JPO OA (Japanese Only) issued Feb. 7, 2012, in Japanese Application No. 2008-242391, which like the present application claims priority to corresponding Korean Appiication No. 10-2008-0048560.

* cited by examiner

SEPARATOR FOR FUEL CELL AND FUEL CELL STACK USING THE SAME

CROSS-REFERENCE TO RELATED APPLICATIONS

This application is a non-provisional application, which claims priority to and the benefit of Korean Patent Application No. 10-2008-0048560, filed on May 26, 2008, in the Korean Intellectual Property Office, the entire content of which is hereby incorporated by reference.

BACKGROUND

1. Field of the Invention

The present invention relates to a separator for fuel cell capable of improving the stack performance by reducing the deviation in cell performance and reducing the dead space, and a fuel cell stack using the same.

2. Description of the Related Art

In recent years, fuel cell separators have been used in fuel cell stacks having a plurality of stacked fuel cells. In this case, separators are disposed between two fuel cells functioning to supply fuel or oxidizing agent to adjacent fuel cells. The separators have also functioned to electrically couple two adjacent fuel cells to each other. Therefore, the separator generally includes a channel for supplying fuel to an anode of the fuel cell, and/or a channel for supplying oxidizing agent to a cathode of the fuel cell.

The fuel cell stack may be manufactured with various appearances and shapes corresponding to its intended applications. In particular, the fuel cell stack may be manufactured to have a structure in which a coupling hole is bored inside an active region of the fuel cell, or a structure in which a separator includes a cross channel region. Here, the stack structure in which a coupling hole is bored in the active region of the cell is to prevent a boundary region between the cell and the separator from being cracked when the separator is stacked on the cell. A stack structure in which a separator has a cross channel region may be used to obtain a maximum active region with the same stack volume.

A channel of the separator is generally coupled between an inlet manifold and an outlet manifold, which may be installed in a laminated fuel cell stack. When a plurality of channels are installed in one surface of one separator, the plurality of the channels extend from the inlet manifold to the outlet manifold with the inlet manifold aligned either parallel to the outlet manifold, or extending independently from each other.

However, in the case of the fuel cell stack in which a coupling hole is bored inside the active region of the cell, the presence of the coupling hole prevents the separator from having a plurality of channels extending parallel to each other. Also, when a plurality of channels extending independently of each other are installed in different regions in the fuel cell stack including a coupling hole inside the active region of the cell, the inlet manifold and the outlet manifold are disposed either in a central region of the top and bottom channel regions, or the left and right channel regions of the separator, both scenarios leading to increased dead space. Since the active region of the cell is reduced with the increase in the dead space, the power density per cell volume may be low.

Further, when a separator having a plurality of channels independently extended to different regions is used in the fuel cell stack, the inlet manifold and the outlet manifold are disposed in a diagonal direction with respect to the channel region of the separator. In this configuration a fuel flow rate concentration may be non-uniform in channel groups independently formed between the inlet manifold and the outlet manifold. Non-uniform fuel flow rate concentration may lead to deteriorated stack performance.

SUMMARY OF CERTAIN INVENTIVE ASPECTS

In one aspect a fuel cell separator comprises a base member, a first channel group having at least one channel, and a second channel group having at least one channel. In some embodiments the first channel group is disposed on at least one surface of the base member. In some embodiments the second channel group is disposed on the at least one surface of the base member. In some embodiments the at least one surface comprises a first region, a second region and a central region disposed between the first region and the second region. In some embodiments the first channel group and the second channel group extend parallel to each other in the first region and the second region. In some embodiments the first channel group and the second channel group extend independently of each other in the central region.

In some embodiments the central region comprises less than a half of an area of the at least one surface, the area comprising the first channel group and the second channel group. In some embodiments the area has a cross shape. In some embodiments the central region comprises a hole. In some embodiments the fuel cell separator further comprises a first manifold in which a first end of the second channel group is coupled to a first end of the first channel group and a second manifold in which a second end of the second channel group is coupled to a second end of the first channel group. In some embodiments the at least one surface of the base member comprises a quadrilateral shape. In some embodiments the first manifold is disposed on a first edge of the base member and the second manifold is disposed on a second edge of the base member such that the first edge and the second edge are positioned opposite each other. In some embodiments the first end of the first channel group and the first end of the second channel group are independently coupled to the first manifold. In some embodiments the second end of the first channel group and the second end of the second channel group are independently coupled to the second manifold.

In another aspect a fuel cell stack comprises a fuel cell including an anode, a cathode and an electrolyte separating the cathode from the anode and a separator in contact with a first surface of the fuel cell, the separator configured to supply a reactant to the anode or the cathode.

In some embodiments the separator comprises a base member, a first channel group having at least one channel and a second channel group having at least one channel. In some embodiments the first channel group is disposed on at least one surface of the base member. In some embodiments the second channel group is disposed on the at least one surface of the base member. In some embodiments the at least one surface comprises a first region, a second region and a central region disposed between the first region and the second region. In some embodiments the first channel group and the second channel group extend parallel to each other in the first region and the second region. In some embodiments the first channel group and the second channel group extend independently of each other in the central region.

In some embodiments the central region comprises less than a half of an area of the at least one surface, the area comprising the first channel group and the second channel group. In some embodiments the area has a cross shape. In some embodiments the separator has a hole formed in a central region in which the channels are formed. In some embodiments the fuel cell stack further comprises a first manifold in which a first end of the second channel group is coupled to a first end of the first channel group and a second manifold in which a second end of the second channel group is coupled to a second end of the first channel group. In some embodiments the at least one surface of the base member comprises a quadrilateral shape. In some embodiments the first manifold is disposed on a first edge of the base member and the second manifold is disposed on a second edge of the base member such that the first edge and the second edge are positioned opposite each other in two facing edge regions of the base member. In some embodiments the first end of the first channel group and the first end of the second channel group are independently coupled to the first manifold. In some embodiments the second end of the first channel group and the second end of the second channel group are independently coupled to the second manifold. In some embodiments the fuel cell is a direct methanol fuel cell.

BRIEF DESCRIPTION OF THE DRAWINGS

After considering the accompanying drawings in light of the section entitled "Detailed Description" one will understand how the features of this invention provide advantages that include the ability to make and use a fuel cell separator and a fuel cell stack using the same.

DETAILED DESCRIPTION OF CERTAIN EMBODIMENTS

Figure 1:
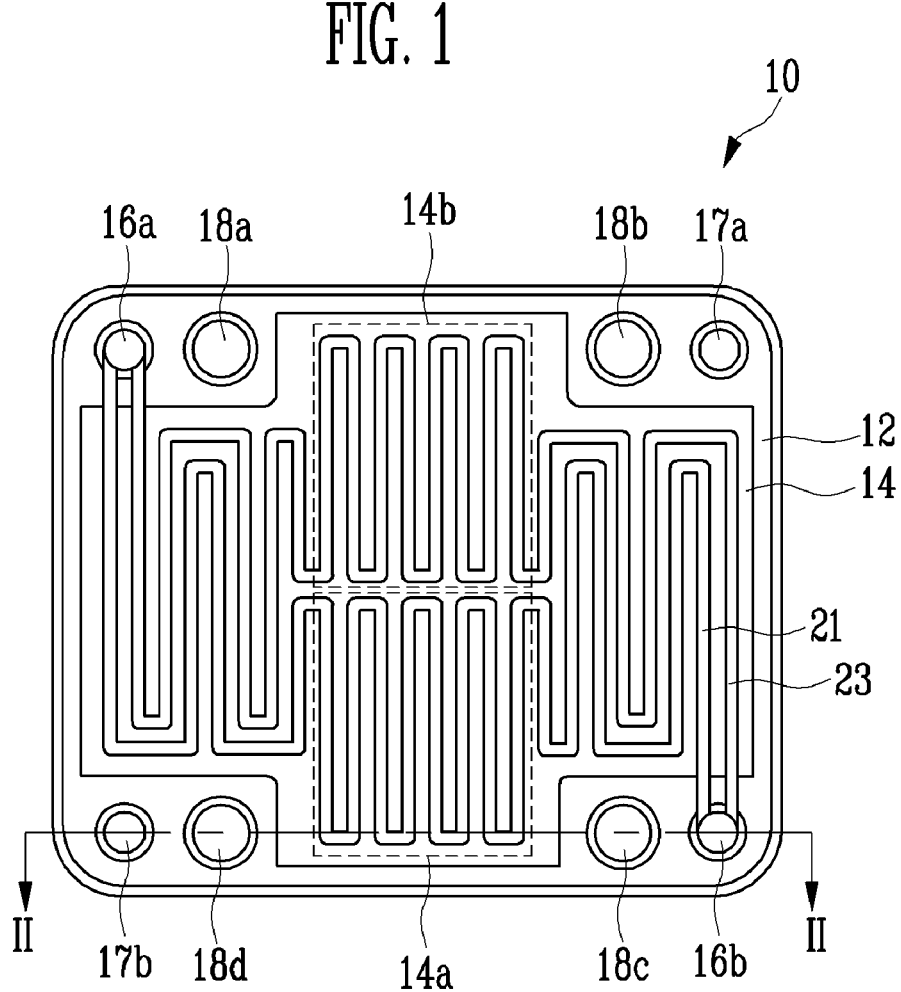
FIG. 1 is a plan view of a separator for fuel cell according to one embodiment.

As will be appreciated, the following detailed description is directed to certain specific embodiments of the invention. However, one of ordinary skill in the art will recognize the invention can be embodied in a multitude of different ways. Hereinafter, representative embodiments easily carried out by those skilled in the art will be described with reference to the accompanying drawings.

In the following description, high absorption and high absorbent does not substantially involve absorption of energy and is defined by a movement of system by means of interaction of materials. In particular, although embodiments may be configured for movement of gas and/or solid, as a convention the description below only describes movement of liquid. Also, in the description below the thickness or size of each layer shown in the drawings can be varied. Detailed descriptions of well-known functions or constitutions will be omitted so as not to obscure the subject matter of the present disclosure.

Figure 2:
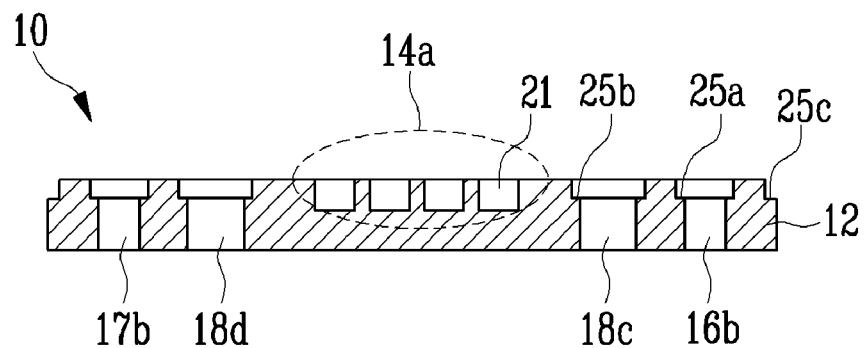
FIG. 2 is a cross-sectional view taken from a line II-II of the separator as shown in FIG. 1.

FIG. 1 is a plane view showing a separator for fuel cell according to one embodiment. FIG. 2 is a cross-sectional view taken from a line II-II of the separator as shown in FIG. 1.

As illustrated in FIGS. 1 and 2, the separator 10 includes a base member 12; a channel region 14 formed in at least one surface of the base member 12 and having a cross shape; a plurality of manifolds 16a, 16b, 17a and 17b formed in the outskirts of the channel region 14; a plurality of coupling holes 18a, 18b, 18c and 18d disposed spaced apart at a predetermined distance from each of the manifolds and formed in the outskirts of the active channel region 14; and a first channel 21 and a second channel 23 formed between a pair of the manifolds 16a and 16b. Here, the channel region 14 represents a region in which channels are formed, and may be referred to as a region to which a reactant is supplied by the fuel cell separator.

The separator 10 may comprise a bipolar plate structure having channels formed in both sides thereof, or a monopolar plate structure having a channel formed in one side thereof. The base member 12 may comprise a carbon separator made of high-density graphite, a complex separator made of carbon and polymer, or a metal separator made mainly of stainless steel.

The manifolds 16a, 16b, 17a and 17b include a pair of first manifolds 16a and 16b for flow of fuel; and a pair of second manifolds 17a and 17b for flow of oxidizing agent. The pair of the first manifolds 16a and 16b are disposed respectively in two facing edge regions of the base member 12 having an approximately quadrilateral shape. The pair of the second manifolds 17a and 17b are disposed respectively in two other facing edge regions of the base member 12 having an approximately quadrilateral shape. The first manifolds 16a and 16b are installed in the fuel cell stack configured to supply fuel to an anode of each cell. They further represent fuel flowing holes penetrating the base member 12 in a thickness direction of the base member 12. The second manifolds 17a and 17b are installed in the fuel cell stack configured to supply oxidizing agent to a cathode of each cell, and represent oxidizing agent flowing holes penetrating the base member 12 in a thickness direction of the base member 12.

The coupling holes 18a, 18b, 18c and 18d represent holes penetrating a coupling unit. For example, the coupling holes may comprise a bolt that couples a plurality of fuel cells. Two of the fuel cells may include separator 10 inserted and stacked thereon. In this embodiment, four coupling holes 18a, 18b, 18c and 18d are disposed respectively between extensions of the channel regions that are extended outwardly in a cross shape to be spaced apart in a predetermined distance from each of the manifolds. In some embodiments some or all of the above-mentioned coupling holes may be omitted depending on the particular coupling structure.

The first channel 21 and the second channel 23 are flow channels through which a fuel flows from an inlet manifold 16a. The fuel is diffused into an anode of each of the cells in the fuel cell stack while being passed through the first channel 21 and the second channel 23.

The separator 10 may also include first interception units 25a formed inside the two manifolds 16b and 17b, second interception units 25b formed inside the two coupling holes 18c and 18d, and interception unit 25c formed in both edges of the base member 12, as shown in FIG. 2. A gasket (not shown) seals a space between the cell and the separator 10. The gasket may be partially inserted into the interception units during installation of the separator 10. As illustrated in FIG. 2 in some embodiments the separator 10 has a monopolar plate structure where channels are formed in one side of the separator 10.

Among separators, which include a plurality of channels and having the same size, a particular separator may have a structure configured to minimize dead space. This type of separator structure may be referred to as an asymmetric channel structure. Using this type of separator may improve stack performance by expanding an active area of the cells in the separators having the same volume. Hereinafter, the structures and functions of the separator will be described in more detail.

In some embodiments the first channel 21 and the second channel 23 extend parallel to each other in a first direction proceeding from the inlet manifolds 16a for flow of fuel to the outlet manifolds 17b for flow of oxidizing agent. The first channel 21 and the second channel 23 are bent together at an angle of 180° in an adjacent region of the outlet manifold 17b, and then extend parallel to each other again in an inverse direction of the first direction. The first channel 21 and the second channel 23 are also bent together at an angle of 180° in an adjacent region of the inlet manifold 16a, and then extend parallel to each other again in the first direction. That is to say, the first channel 21 and the second channel 23 extend parallel to each other in a meandered shape in the channel region that is adjacent to the inlet manifold 16a.

Also, the first channel 21 does not extend in parallel to the second channel 23 in its own central region, that is, in a first middle channel region 14a, but extends in a meandered manner to have its own separate channel pattern. Similarly, the second channel 23 does not extend in parallel to the first channel 21 in its own central region, that is, in a second middle channel region 14b, but extends in a meandered manner to have its own separate channel pattern. In addition, the first channel 21 and the second channel 23 extend in parallel to each other, or extend in a meandered manner in a first direction approximately parallel with a line on which the outlet manifold 16b for flow of fuel is coupled to the inlet manifold 17a for flow of an oxidizing agent in the channel region adjacent to the fuel-flowing outlet manifold 16b. Furthermore, both ends of the first channel 21 and both ends of the second channel 23 are independently coupled to the inlet manifold 16a outlet manifold 16b for flow of fuel, respectively. The structure in which first channel 21 and the second channel 23 are independently coupled to the inlet manifold 16a and/or the outlet manifold 16b is one of the major technical characteristics of this particular embodiment. The above-mentioned coupling structure of the first channel 21 and the second channel 23 may prevent undesired pressure difference from being caused between the first channel 21 and the second channel 23 since the first channel 21 and the second channel 23 have different lengths in the channel region adjacent to the inlet manifold 16a.

Figure 3:
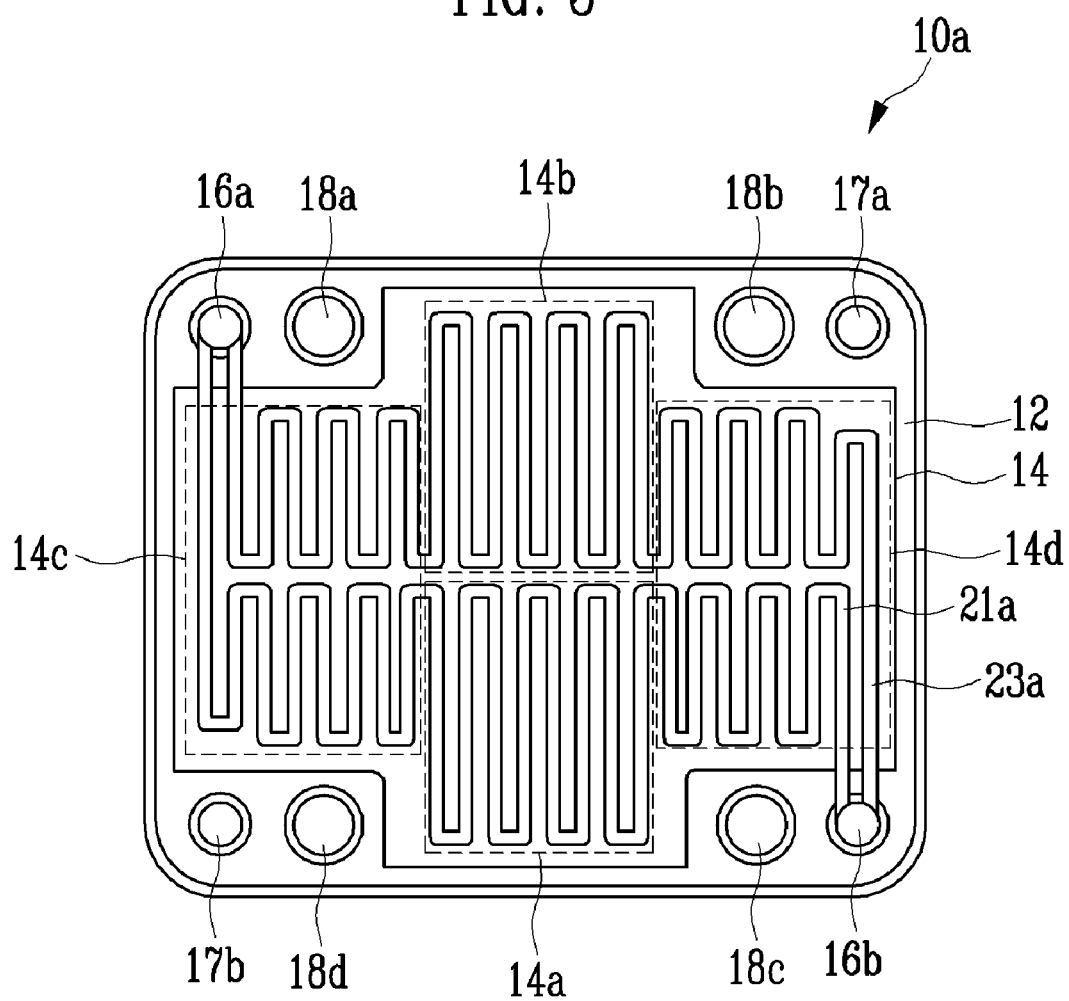
FIG. 3 is a plan view of a separator for fuel cell according to one comparative example.

FIG. 3 illustrates a plane view of a fuel cell separator according to one comparative example. The separator 10a is shown for comparison to the channel structure of the separator 10 of the above-described embodiment illustrated in FIGS. 1 and 2. In description of the separator 10a of the comparative example, the same or similar parts as in the separator 10 of this embodiment as shown in FIG. 1 have the same reference numerals, and their redundant descriptions are omitted for clarity.

Referring to FIG. 3, in the case of the separator 10a the first channel 21a and the second channel 23a do not extend parallel to each other in an anode inlet-side channel region 14c, but instead extend to different regions in a meandered manner and each has its own distinct channel pattern. Also, the first channel 21a does not extend parallel to the second channel 23a in its own central region, that is, in a first middle channel region 14a, but instead extends into substantially different regions in a meandered manner and has its own separate channel pattern. Further, the second channel 23a does not extend parallel to the first channel 21a in its own central region, that is, in a second middle channel region 14b, but instead extends to different regions in a meandered manner and has its own separate channel pattern. The first channel 21a and the second channel 23a do not extend parallel to each other in the channel region 14d adjacent to the fuel outlet manifold 16b, but instead extend to different regions in a meandered manner and each also has its own separate channel pattern.

According to the structure of the separator 10a in the comparative example, a generation position of carbon dioxide generated from the oxidation reaction of a fuel passed through the first channel 21a is highly different from a generation position of carbon dioxide generated from the oxidation reaction of a fuel passed through the second channel 23a, based on the distance from the inlet manifold 16a. When the vapor-phase carbon dioxide with high volume is generated in different position of the first channel 21a and the second channel 23a, different pressures are applied to the first channel 21a and the second channel 23a in the anode inlet-size channel region 14c. In some embodiments a fuel may be concentrated in one channel due to the occurrence of this pressure difference, and a bypass flow channel may be formed through a gas diffusion layer. As described above, the separator 10a of the comparative example has a problem that it is difficult to secure the performance stability of the fuel cell stack.

Figure 4:
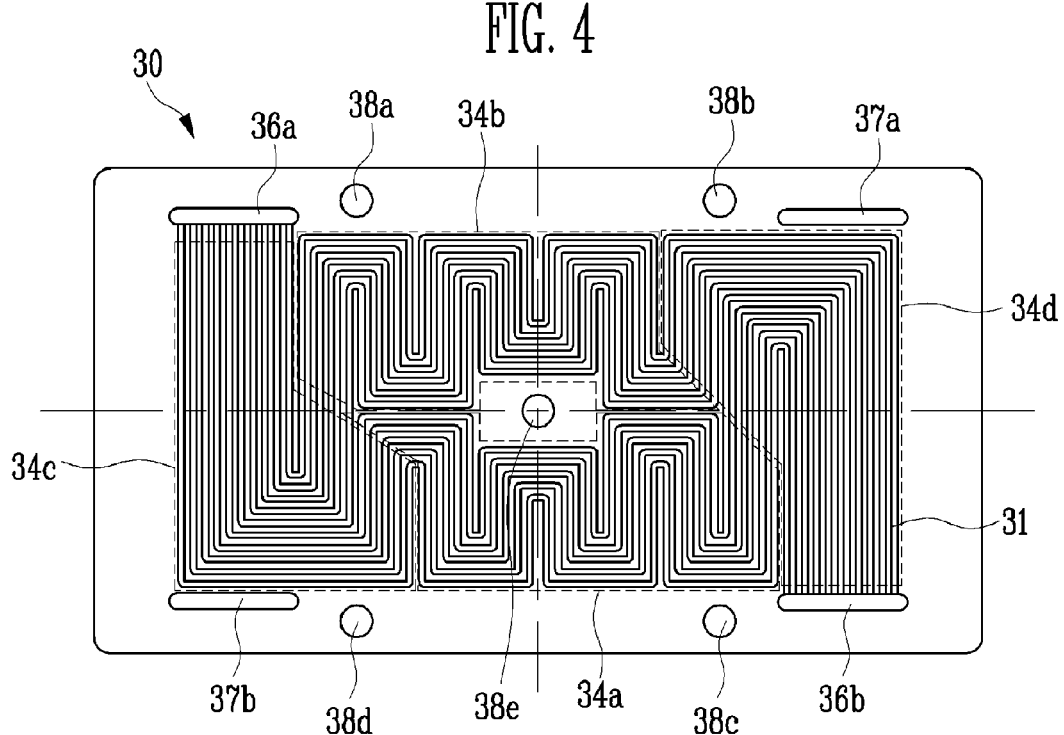
FIG. 4 is a plan view of a separator for fuel cell according to another embodiment.

FIG. 4 illustrates a plane view of a separator for fuel cell according to another embodiment. The separator 30 includes coupling holes 38a, 38b, 38c, 38d and 38e through which coupling members are inserted in the coupling of a laminated fuel cell stack. Four holes 38a, 38b, 38c and 38d are installed outside a region in which channels are formed, that is, outside the channel region of the separator 30, and one hole 38e is installed inside the channel region of the separator 30. Also, the separator 30 includes a plurality of channels 31. A plurality of the channels 31 may be divided into two groups: a first channel group including first channels passed through a first middle channel region 34a, and a second channel group including second channels passed through a second middle channel region 34b. Additionally, the separator 30 includes a first fuel-flowing inlet manifold 36a, a first fuel-flowing outlet manifold 36b, a second oxidizing agent-flowing inlet manifold 37a and a second oxidizing agent-flowing outlet manifold 37b. A first end of each of the channels in the first channel group and a first end of each of the channels in the second channel group are coupled to the first inlet manifold 36a. Also, a second end of each of the channels in the first channel group and a second end of each of the channels in the second channel group are coupled to the first outlet manifold 36b.

Each of the channels 31 in the first channel group and each of the channels 31 in the second channel group extend parallel to each other in the anode inlet-side channel region 34c. Also, each of the channels 31 in the first channel group and each of the channels 31 in the second channel group extend parallel to each other in the anode outlet-side channel region 34d. However, the channels of the first channel group and the channels of the second channel group independently extend in different regions of the central region. That is to say, in some embodiments the channels of the first channel group extend parallel to each other in the first middle channel region 34a, and the channels of the second channel group extend parallel to each other in the second middle channel region 34b.

Figure 5:
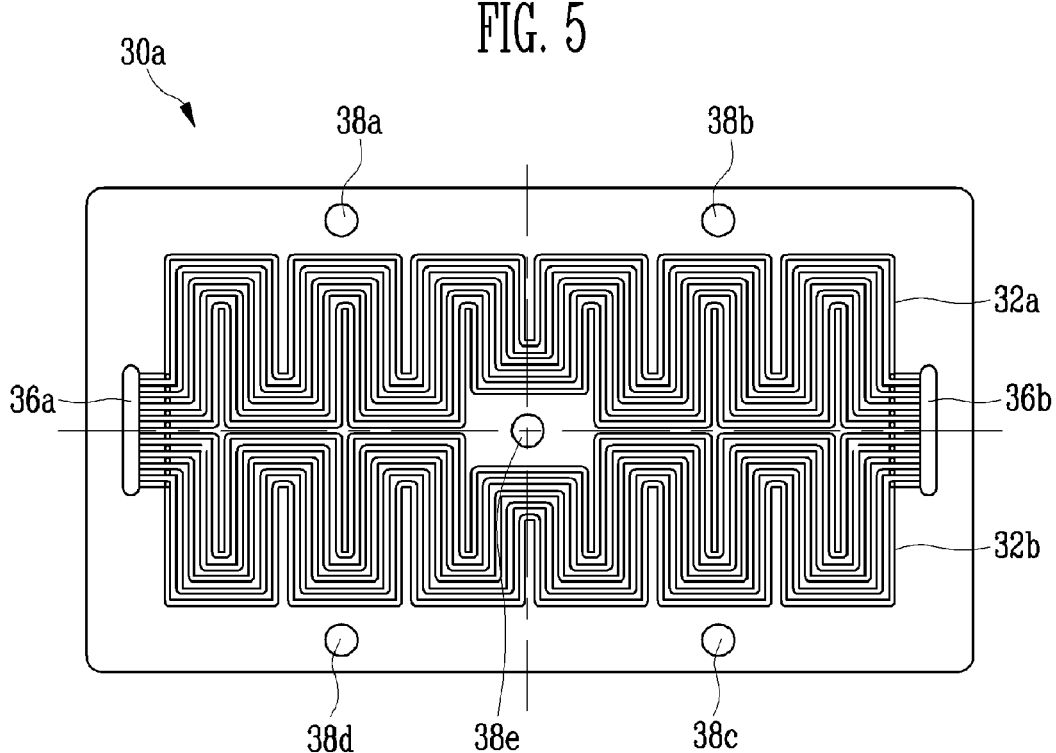
FIG. 5 is a plan view of a separator for fuel cell according to one comparative example.

FIG. 5 illustrates a plane view showing a separator for fuel cell according to one comparative example. The separator 30a includes a first fuel-flowing inlet manifold 36a and a first fuel-flowing outlet manifold 36b. The separator 30a also includes channels 32a of the first channel group and channels 32b of the second channel group that independently extend in different regions. When the channel region of the separator 30a is divided into a first upper channel region and a second lower channel region, the channels 32a of the first channel group extend from the first inlet manifold 36a to the first outlet manifold 36b via the first upper channel region. In some embodiments the channels 32b of the second channel group extend from the first inlet manifold 36a to the first outlet manifold 36b via the second lower channel region.

The separator 30a has a higher dead space than that of the above-mentioned separator 30. That is to say, the separator 30a according to the comparative example has an increased dead space due to the presence of the manifolds; the first inlet manifold 36a and the first outlet manifold 36b are provided in a middle region in a width direction of the separator 30a. However, the separator 30 may have a more decreased dead space than the separator 30a according to the comparative example since the first inlet manifold 36a and the first outlet manifold 36b are installed in two facing edge regions of the separator 30 having an approximately quadrilateral shape. Of course, in some embodiments the above-mentioned separator 30a may have the technical characteristics as described in reference to the separator 30.

Figure 6:
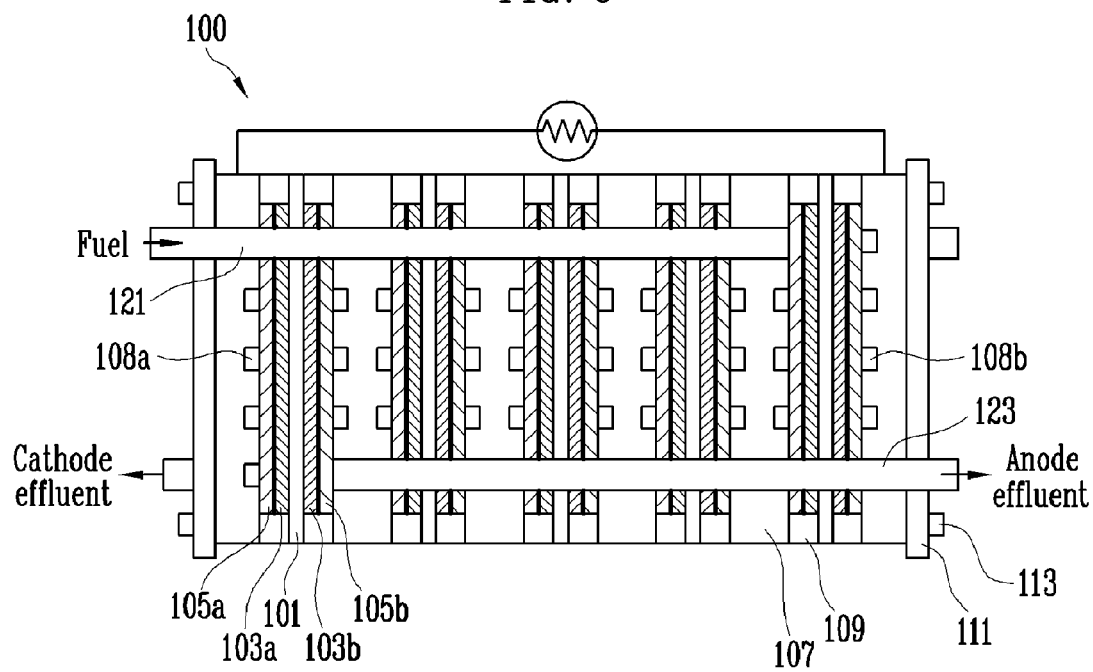
FIG. 6 is a schematic view showing a fuel cell system used in the fuel cell stack according to one embodiment.

FIG. 6 illustrates a schematic view showing a fuel cell system used in the fuel cell stack according to another embodiment. The fuel cell stack 100 includes an anode, a cathode and an electrolyte 101 separating the anode from the cathode. The anode comprises an anode catalyst layer 103a and a first gas diffusion layer 105a. The cathode comprises a cathode catalyst layer 103b and a second gas diffusion layer 105b. A stacked body of the anode, the electrolyte 16 and the cathode constitutes one cell, and so-called referred to as a membrane electrode assembly (MEA).

Further, the fuel cell stack 100 includes a separator 107, a gasket 109, a pair of end plates 111, a coupling member 113, a fuel-flowing inlet manifold 121, and a fuel-flowing outlet manifold 123. The separator 107 may be referred to as a separator plate. The separator 107 may be placed between cells to form a stacked body together with the cells. In some embodiments a plurality of fuel-flowing channels 108a supplying a mixed fuel to an anode of each cell and/or oxidizing agent-flowing channels 108b supplying an oxidizing agent of a cathode of each cell are also provided in the separator 107. In some embodiments the gasket 109 functions to form an airtight seal on each of the cells so as to prevent the external air or impurities from penetrating into the cells without leaking the mixed fuel and the oxidizing agent supplied to each of the cells. In some embodiments a pair of the end plate 111 are disposed in both ends of the stacked body on which the cells and the separator 107 are laminated, and coupled to each other by the coupling member 113 so as to support the stacked body in a lamination direction.

The separator 107 may be the same as one of the above-mentioned separators 10 and 30. In the embodiment of FIG. 6 the separator 107 is configured so that the channels 108a in each cell formed in the channel region adjacent to the inlet manifold 121 can have similar lengths as possible as they are, and the channels can be independently coupled to the inlet manifold 121 to run parallel to each other.

According to some embodiments of the fuel cell stack, it is possible to secure stack performance stability by solving the known problems caused by the different lengths of the channels in the adjacent active region of the inlet manifold 121 and preventing bypass flow channels from being formed into a gas diffusion layer 105a. In particular, it is possible to stably maintain the stack performance that may be made unstable when the fuel and/or the oxidizing agent are supplied at a low content. In the embodiment of FIG. 6 the bypass flow channels represent short path of flow channels traversing meandered channels, or short paths of flow channels formed between adjacent channels. Since the formation of the bypass flow channels prevent the supply of the fuel or the oxidizing agent into some of the channels, an actual active area generating electricity in the cells may be decreased, which leads to the deterioration in the cell performance.

Figure 7:
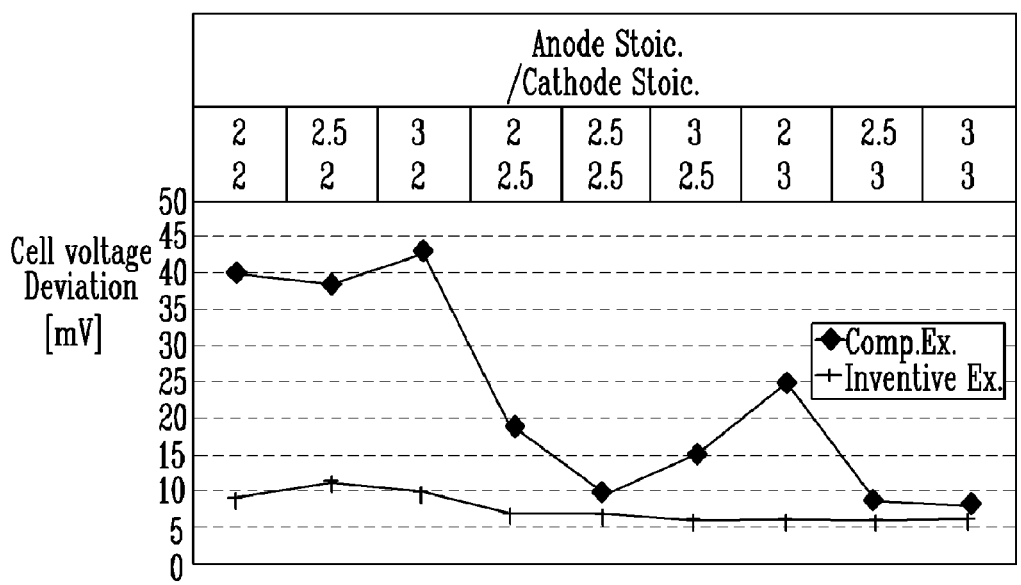
FIG. 7 is a graphic diagram illustrating the output performances of the fuel cell stacks and the comparative example.

FIG. 7 is a graphic diagram illustrating the output performances of the fuel cell stacks according to the present invention and the comparative example. In this experiment, the fuel cell stacks have the same specifications, except that the fuel cell stack according to one embodiment uses the separator illustrated in FIG. 1 and the fuel cell stack according to the comparative example uses the separator illustrated in FIG. 3. The fuel cell stack used in this experiment includes 20 cells, and has a cell average voltage of approximately 4.5 V in normal operation of the stack.

As shown in FIG. 7, the fuel cell stack according to the comparative example has the maximum standard deviation in cell voltage when a stoichiometric ratio (anode stoichiometry) of the fuel supplied to an anode-side inlet manifold and a stoichiometric ratio (cathode stoichiometry) of the air supplied to a cathode-side inlet manifold are each independently of about 2, about 2.5 and about 3. For example, when the stoichiometric ratio of the air is about 2, the deviations in cell voltage are shown to be approximately 40 mV, approximately 39 mV and approximately 43 mV according to the stoichiometric ratio of the fuel. When the stoichiometric ratio of the air is about 2.5, the deviations in cell voltage are shown to be approximately 19 mV, approximately 10 mV and approximately 15 mV according to the stoichiometric ratio of the fuel. Also, when the stoichiometric ratio of the air is about 3, the deviations in cell voltage are shown to be approximately 25 mV, approximately 9 mV and approximately 8 mV according to the stoichiometric ratio of the fuel. As described above, it is revealed that the deviations in cell voltage are highly affected in the fuel cell stack according to the comparative example when the stoichiometric ratio of the air is about 2 that is, lower than about 3 or about 2.5.

Also, the deviations in cell voltage are measured to be higher in the fuel cell stack according to the comparative example when the stoichiometric ratio of the fuel is about 2 than when the stoichiometric ratio of the fuel is about 2.5 or about 3. For example, when the stoichiometric ratio of the fuel is about 2 and the stoichiometric ratio of the air is about 2.5, the deviation in cell voltage is approximately 19 mV. This value is higher than the deviation in cell voltage (for example, approximately 10 mV or approximately 15 mV) obtained when the stoichiometric ratio of the air is about 2.5 and the stoichiometric ratio of the fuel is about 2.5 or about 3. Also, the deviation in cell voltage (1) is approximately 25 mV when the stoichiometric ratio of the fuel is about 2 than when the stoichiometric ratio of the air is about 3. This value is approximately three times higher than the deviation in cell voltage (for example, approximately 9 mV or approximately 8 mV) obtained when the stoichiometric ratio of the air is about 3 and the stoichiometric ratio of the fuel is about 2.5 or about 3. As described above, it is revealed that the deviations in cell voltage generally tend to be high in the fuel cell stack according to the comparative example when the stoichiometric ratio of the fuel is about 2 that is, lower than about 3 or about 2.5.

When the stoichiometric ratio of the fuel and/or the stoichiometric ratio of the air are low in the above-mentioned fuel cell stack according to the comparative example, one reason for the increases in the deviation in cell voltage is that the deviation in flow rate between the cells is seriously increased according to the fuel flow rate between the channels that are independently coupled between the inlet manifold and the outlet manifold for flow of fuel. In a similar manner, the reason for the increases in the deviation in cell voltage is that the deviation in flow rate between the cells is seriously increased according to the oxidizing agent flow rate between the channels that are independently coupled between the inlet manifold and the outlet manifold for flow of oxidizing agent. For example, the reason for the increases in the deviation in cell voltage is owing to a phenomenon in which a fuel flows in one of the two channels and the fuel is sluggish in the other channel. In particular, this phenomenon occurs more easily due to the pressure difference generated between the two channels when a liquid-phase material and a gas-phase material flow around.

Also referring to FIG. 7, the fuel cell stack according to this embodiment has almost constant low deviation in cell voltage when the stoichiometric ratios of the fuel and air supplied to the stack are each independently about 2, about 2.5 and about 3. For example, the deviations in cell voltage are shown to be approximately 9 mV, approximately 11 mV and approximately 10 mV according to the stoichiometric ratio of the fuel when the stoichiometric ratio of the air is about 2. The deviations in cell voltage are shown to be approximately 7 mV, approximately 7 mV and approximately 6 mV according to the stoichiometric ratio of the fuel when the stoichiometric ratio of the air is about 2.5. Also, the deviations in cell voltage are shown to be approximately 6 mV, approximately 6 mV and approximately 6 mV according to the stoichiometric ratio of the fuel when the stoichiometric ratio of the air is about 3. As described above, the fuel cell stack according to this embodiment has almost constant low deviation in cell voltage of approximately 11 mV to approximately 6 mV when the stoichiometric ratios of the fuel are about 2, about 2.5 and about 3, and when the stoichiometric ratios of the air are about 2, about 2.5 and about 3. Thus, the separator according to this and other embodiments may be useful to stably maintain the stack performance without deteriorating the stack performance even when the amount of the fuel and/or oxidizing agent supplied to the fuel cell stack is changed.

The foregoing description details certain representative embodiments of the invention. It will be appreciated, however, that no matter how detailed the foregoing appears in the text, the invention can be practiced in additional ways. It should also be noted that the use of particular terminology when describing certain features or aspects of the invention should not be taken to imply that the terminology is being re-defined herein to be restricted to include any specific characteristics of the features or aspects of the invention with which that terminology is associated. Further, numerous applications are possible for devices of the present disclosure. It will be appreciated by those skilled in the art that various modifications and changes may be made without departing from the scope of the invention. Such modifications and changes are intended to fall within the spirit and scope of the invention, as defined by the appended claims.

What is claimed is:

1. A fuel cell separator, comprising:
   a base member;
   a first channel group having at least one channel, wherein the first channel group is disposed on at least one surface of the base member;
   a second channel group having at least one channel, wherein the second channel group is disposed on the at least one surface of the base member, wherein the at least one surface comprises a first region, a second region and a central region disposed between the first region and the second region, the first channel group and the second channel group extend parallel to each other in meandered shapes in the first region and the second region, wherein the first channel group and the second channel group extend independently of each other in the central region, the first channel group and the second channel group are mirror images of each other in the central region, the first channel group and the second channel group are mirror images of each other in the central region and wherein the first channel group and the second channel group extend over an area of the at least one surface, the area comprising a first surface area having a rectangular shape and a second surface area having a rectangular shape, the first surface area and the second surface area positioned such that the area has a cross shape;
   a first manifold in which a first end of the second channel group is coupled to a first end of the first channel group; and
   a second manifold in which a second end of the second channel group is coupled to a second end of the first channel group,
   wherein the first manifold is disposed on a first edge of the base member and the second manifold is disposed on a second edge of the base member such that the first edge and the second edge are positioned opposite each other.

2. The fuel cell separator of claim 1, wherein the central region comprises less than a half of the area.

3. The fuel cell separator of claim 1, wherein the central region comprises a hole.

4. The fuel cell separator of claim 1, wherein the at least one surface of the base member comprises a quadrilateral shape.

5. The fuel cell separator of claim 4, wherein the second end of the first channel group and the second end of the second channel group are independently coupled to the second manifold.

6. The fuel cell separator of claim 1, wherein the first end of the first channel group and the first end of the second channel group are independently coupled to the first manifold.

7. A fuel cell stack, comprising:
   a fuel cell including an anode, a cathode and an electrolyte separating the cathode from the anode; and
   separator of claim 1 positioned in contact with a first surface of the fuel cell, the separator configured to supply a reactant to the anode or the cathode.

8. The fuel cell stack of claim 7, wherein the central region comprises less than a half of the area.

9. The fuel cell stack of claim 7, wherein the separator has a hole formed in a central region of the region in which the channels are formed.

10. The fuel cell stack of claim 9, wherein the second end of the first channel group and the second end of the second channel group are independently coupled to the second manifold.

11. The fuel cell separator of claim 7, wherein the at least one surface of the base member comprises a quadrilateral shape.

12. The fuel cell stack of claim 7, wherein the first end of the first channel group and the first end of the second channel group are independently coupled to the first manifold.

13. The fuel cell stack of claim 7, wherein the fuel cell is a direct methanol fuel cell.

* * * * *